United States Patent
Kimura (10) Patent No.: US 8,855,482 B2
(45) Date of Patent: Oct. 7, 2014

(54) IMAGING APPARATUS AND SOUND PROCESSING APPARATUS

(71) Applicant: Canon Kabushiki Kaisha, Tokyo (JP)

(72) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/779,539

(22) Filed: Feb. 27, 2013

(65) Prior Publication Data
US 2013/0230307 A1 Sep. 5, 2013

(30) Foreign Application Priority Data
Mar. 2, 2012 (JP) ................... 2012-046773

(51) Int. Cl.
G03B 17/24 (2006.01)
G03B 31/00 (2006.01)
G10K 11/16 (2006.01)
G03B 19/12 (2006.01)

(52) U.S. Cl.
CPC ............... *G03B 31/00* (2013.01); *G03B 19/12* (2013.01); *G10K 11/16* (2013.01)
USPC .......................................... 396/312

(58) Field of Classification Search
USPC ......................................... 396/312
See application file for complete search history.

(56) References Cited

U.S. PATENT DOCUMENTS

| | | | |
|---|---|---|---|
| 6,982,755 B1* | 1/2006 | Kikuzawa | 348/241 |
| 8,514,300 B2* | 8/2013 | Sonoda | 348/231.4 |
| 2008/0074527 A1* | 3/2008 | Kato | 348/311 |
| 2010/0318349 A1* | 12/2010 | Kovesi et al. | 704/207 |
| 2011/0279730 A1* | 11/2011 | Goshi | 348/627 |

FOREIGN PATENT DOCUMENTS

| | | |
|---|---|---|
| JP | 2000-156823 A | 6/2000 |
| JP | 2005-176015 A | 6/2005 |
| JP | 2006-203376 A | 8/2006 |

* cited by examiner

Primary Examiner — Christopher Mahoney
Assistant Examiner — Linda B Smith
(74) Attorney, Agent, or Firm — Canon USA Inc IP Division (57) ABSTRACT

A control unit controls a driving unit to drive an optical system in a first driving mode and controls a sound processing unit to process a sound signal in a first noise reduction processing mode in the case where a level of the sound signal obtained by a sound obtaining unit is lower than a predetermined level. The control unit controls the driving unit to drive the optical system in a second driving mode with a longer driving time than the first driving mode and controls the sound processing unit not to process the sound signal in the first noise reduction processing mode in the case where the level of the sound signal obtained by the sound obtaining unit is equal to or higher than the predetermined level.

18 Claims, 10 Drawing Sheets

IMAGING APPARATUS AND SOUND PROCESSING APPARATUS

BACKGROUND OF THE INVENTION

1. Field of the Invention

The present invention relates to an imaging apparatus and a sound processing apparatus.

2. Description of the Related Art

Examples of the sound processing apparatus known in the related art include an imaging apparatus capable of recording a sound together with a shot moving image.

This type of imaging apparatus has a problem in that noise, generated by an optical system being driven, is recorded as a sound. To cope with this problem, various noise reduction techniques have been developed (see, for example, Japanese Patent Application Laid-Open No. 2006-203376). Japanese Patent Application Laid-Open No. 2006-203376 has proposed a technique in which, when an iris motor or a shutter motor of an imaging apparatus is driven, a sound generated immediately before the driving of the motor is used to interpolate a sound generated in a period during which noise is generated.

In Japanese Patent Application Laid-Open No. 2005-176015, an ambient sound is monitored during so-called moving image shooting, and an optical system is adjusted in a silent mode under a quiet environment. Japanese Patent Application Laid-Open No. 2005-176015 discloses a technique of appropriately controlling, for example, the driving speed in the silent mode, thereby suppressing a sound generated by the adjustment of an imaging optical system and clearly recording only a sound generated by a subject (subject sound).

In the case where the technique disclosed in Japanese Patent Application Laid-Open No. 2005-176015 is applied, however, the adjustment of an optical system even in the silent mode generates a driving sound. Under a quiet environment, therefore, the driving sound may be recorded.

SUMMARY OF THE INVENTION

In light of the foregoing, an object of the present invention is to provide a sound processing apparatus capable of further reducing an influence of a driving sound on a sound to be recorded, even under a quiet environment.

An imaging apparatus according to an aspect of the present invention includes: an imaging unit; a driving unit; a sound obtaining unit; a sound processing unit; and a control unit. The driving unit is configured to drive an optical system for the imaging unit. The sound obtaining unit is configured to obtain a sound signal. The sound processing unit is configured to process the sound signal obtained by the sound obtaining unit. The control unit is configured to control the driving unit and the sound processing unit. The control unit controls the driving unit to drive the optical system in a first driving mode and controls the sound processing unit to process the sound signal in a first noise reduction processing mode, in a case where a level of the sound signal obtained by the sound obtaining unit is lower than a predetermined level. The control unit controls the driving unit to drive the optical system in a second driving mode with a longer driving time than the first driving mode and controls the sound processing unit not to process the sound signal in the first noise reduction processing mode, in a case where the level of the sound signal obtained by the sound obtaining unit is equal to or higher than the predetermined level.

Further features of the present invention will become apparent from the following description of exemplary embodiments (with reference to the attached drawings).

DESCRIPTION OF THE EMBODIMENTS

Embodiments of the present invention will be described in detail below with reference to the drawings. However, the present invention is not limited to the following embodiments.

(First Embodiment)

In the present embodiment, an imaging apparatus capable of subjecting sound signals, obtained by collecting an ambient sound, to noise reduction processing will be described.

Figure 1:
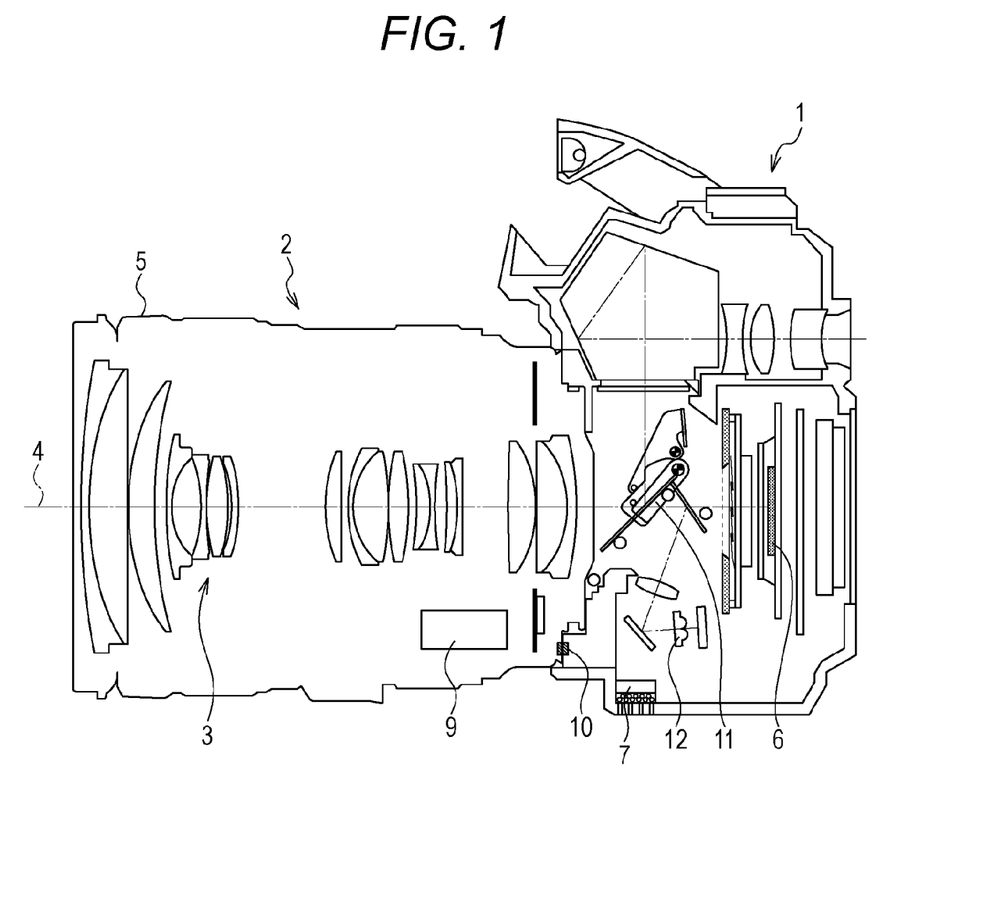
FIG. 1 is a schematic diagram of an imaging apparatus according to embodiments.

An imaging lens 2 can be mounted on an imaging apparatus 1 illustrated in FIG. 1. The imaging apparatus 1 and the imaging lens 2 can be electrically connected to each other at an electrical contact 10, in which case a control unit (not illustrated) of the imaging apparatus 1 and a control unit (not illustrated) of the imaging lens 2 can communicate with each other through the electrical contact 10.

The imaging apparatus 1 includes an image pickup device 6 and a microphone 7. The image pickup device 6 is, for example, a photoelectric conversion device that converts an optical image of a subject into an electrical signal to obtain an image signal. The microphone 7 converts vibration of a sound wave of an ambient sound into an electrical signal to obtain a sound signal. The imaging apparatus 1 also includes a so-called quick-return mirror mechanism 11, and a focus detecting unit 12 including, for example, an AF sensor.

The imaging lens 2, on the other hand, includes a lens barrel 5 and an imaging optical system 3 including one or a plurality of lenses arranged along an optical axis 4 of the imaging lens 2. The imaging lens 2 also includes an optical system driving unit 9 for driving the lenses of the imaging optical system 3.

The control unit (not illustrated) of the imaging apparatus 1 controls the quick-return mirror mechanism 11 to guide a part of an optical image of a subject, input through the imaging lens 2, to the focus detecting unit 12, and cause the focus detecting unit 12 to execute focus detection. The control unit may also realize exposure detection. Based on the detection result, the control unit of the imaging apparatus 1 transmits a lens driving instruction to the control unit of the imaging lens 2. Based on the lens driving instruction, the control unit of the imaging lens 2 controls the optical system driving unit 9 to drive the lenses of the imaging optical system 3. The control unit of the imaging lens 2 may also control the optical system driving unit 9 to drive a diaphragm of the imaging optical system 3 according to a driving instruction based on the exposure detection result.

The control unit of the imaging apparatus 1 according to the present embodiment may also control the imaging optical system 3 of the imaging lens 2 while analyzing the status of an image of an image signal obtained by the image pickup device 6, with an optical image formed on the image pickup device 6 through the control of the quick-return mirror mechanism 11. That is, the control unit can also execute control to gradually drive the imaging optical system 3 such that an edge portion of the image signal obtained by the image pickup device 6 becomes sharp.

With the imaging apparatus 1 according to the present embodiment, a user can obtain an image signal of a subject through the image pickup device 6 in synchronization with the operation of a release button (not illustrated), perform predetermined image processing on an image of the image signal, and record the image in a recording medium (not illustrated).

Next, the functions of the imaging apparatus 1 according to the present embodiment will be described.

Figure 2:
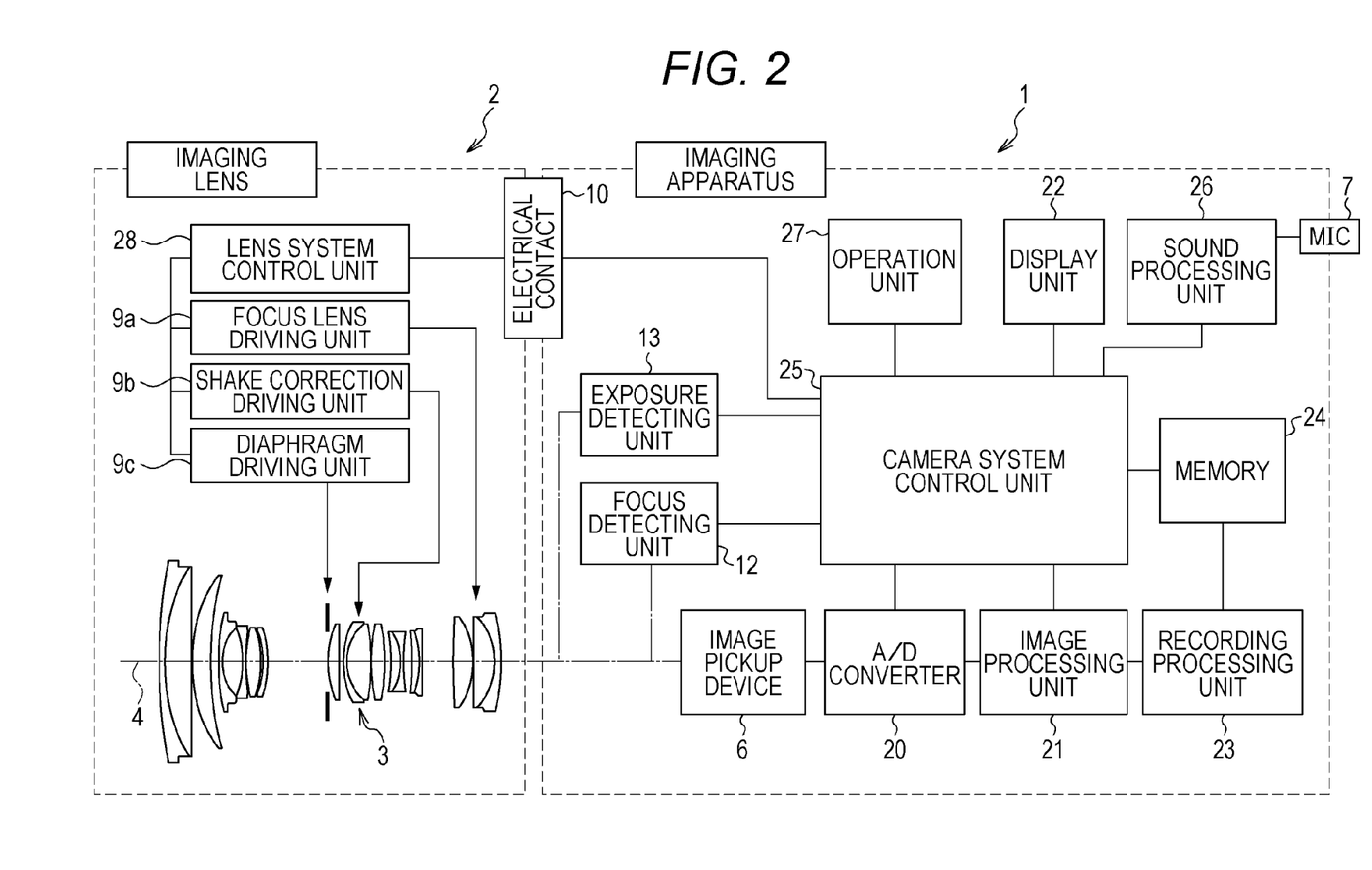
FIG. 2 is a diagram illustrating functional blocks of the embodiments.

FIG. 2 is a diagram illustrating functional blocks of the imaging apparatus 1 and the imaging lens 2 according to the present embodiment.

In FIG. 2, the imaging apparatus 1 includes the focus detecting unit 12, an exposure detecting unit 13, the image pickup device 6, an A/D converter 20, an image processing unit 21, a recording processing unit 23, a memory 24, a camera system control unit 25, the microphone 7, a sound processing unit 26, an operation unit 27, and a display unit 22. The imaging lens 2, on the other hand, includes the imaging optical system 3, a lens system control unit 28, a focus lens driving unit 9a, a shake correction driving unit 9b, and a diaphragm driving unit 9c.

Actually, the functional blocks may each be an independent hardware component, or may be components of a single piece of hardware. The camera system control unit 25 is, for example, a microcomputer including a CPU and a memory. The microcomputer may execute functions of the other functional blocks.

The imaging system forms an optical image of a subject on an imaging plane of the image pickup device 6 through the imaging optical system 3. During a preparatory operation for shooting such as aiming, a mirror provided in the quick-return mirror mechanism 11 is used to guide the optical image toward a viewfinder, instead of guiding the optical image toward the image pickup device 6, and also guide part of a light flux to the focus detecting unit 12. The imaging optical system 3 is appropriately adjusted by a control system described later based on the detection result of the focus detecting unit 12. As a result, the image pickup device 6 is exposed to object light with an appropriate light amount, and a subject image is formed in the vicinity of the image pickup device 6.

The image processing unit 21 processes an image signal received from the image pickup device 6 through the A/D converter 20. The image processing unit 21 includes, for example, a white balance circuit, a gamma correction circuit, and an interpolation circuit for increasing the resolution through interpolation.

The sound processing system subjects a sound signal, obtained by the microphone 7, to appropriate processing with the sound processing unit 26 to generate a sound signal for recording. The generated sound signal for recording is transmitted to the recording processing unit 23 in association with an image by a recording processing unit described later.

The recording processing unit 23 records, in a recording medium (not illustrated), stream data including an image signal and a sound signal, and also generates an image to be output to the display unit 22. The recording processing unit 23 also performs compression coding processing on, for example, an image, a moving image, and a sound with a predetermined method. Any compression coding processing may be performed in the present embodiment.

The camera system control unit 25 controls the respective blocks of the imaging apparatus 1. For example, the camera system control unit 25 generates and outputs a timing signal during imaging based on the input from the operation unit 27, and outputs an instruction signal for driving the lens to the control unit of the imaging lens 2. The camera system control unit 25 also functions to determine the ambient sound level described later, and to compare the ambient sound with the driving sound. The focus detecting unit 12 detects the focus state of an optical image of a subject. The exposure detecting unit 13 detects the brightness of the subject. The lens system control unit 28 appropriately drives the lens to adjust the imaging optical system 3, according to a signal from the camera system control unit 25.

The camera system control unit 25 detects, for example, an operation signal corresponding to the operation of a shutter release button of the operation unit 27, and controls the driving of the image pickup device 6, the operation of the image processing unit 21, and the compression processing of the recording processing unit 23. The camera system control unit 25 further controls the status of each segment of an information display device that displays information on an optical viewfinder, a liquid crystal monitor and the like using the display unit 22.

The operation of adjusting the optical system of the control system will be described. The camera system control unit 25 is connected to the focus detecting unit 12 and the exposure detecting unit 13, and obtains an appropriate focus position and diaphragm position based on signals from these detecting units. The camera system control unit 25 issues an instruction to the lens system control unit 28 via the electrical contact 10, and the lens system control unit 28 appropriately controls the focus lens driving unit 9a and the diaphragm driving unit 9c. The lens system control unit 28 is also connected to a shake detecting sensor (not illustrated). In a shake correction mode, the lens system control unit 28 appropriately controls the shake correction driving unit 9b based on signals from the shake detecting sensor.

Shooting including sound recording, such as so-called moving image shooting, will be described here. In shooting including sound recording, a sound generated upon driving a camera body and a lens actuator (hereinafter referred to as "a mechanical driving sound") is an unwanted sound, i.e., noise. A sound generated by the operation of a button/dial by a user, or a rasping sound of an outer case (hereinafter referred to as "a user operation sound") is also an unwanted sound, i.e., noise. Hereinafter in the present embodiment, the "noise" means the mechanical driving sound or the user operation sound described above, not the background noise such as white noise.

Figure 3:
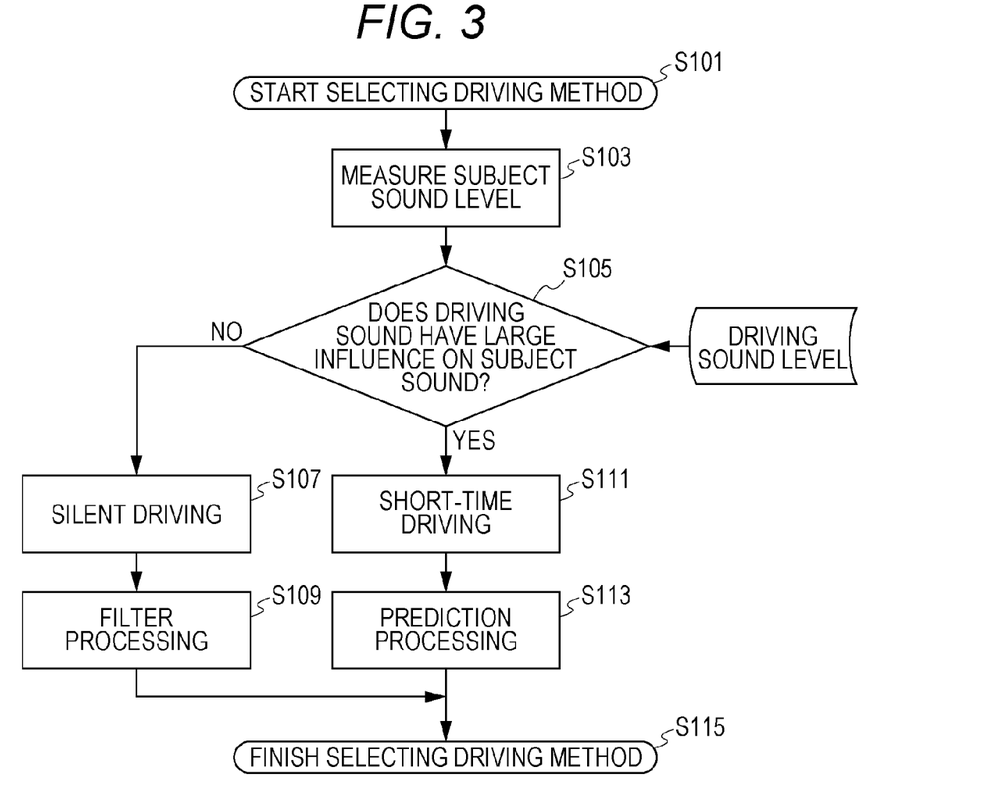
FIG. 3 is a flowchart of a first embodiment.

FIG. 3 is a flowchart illustrating the procedure of selecting the method of driving the driving units 9 (the focus lens driving unit 9a, the shake correction driving unit 9b, and the diaphragm driving unit 9c) at the time of moving image shooting in the present embodiment. This flowchart illustrates the operations to be executed by the respective blocks of the imaging apparatus 1 based on the instruction from the camera system control unit 25. The camera system control unit 25 of the imaging apparatus 1 according to the present embodiment issues, as necessary, an instruction to the lens system control unit 28 to operate the respective driving units 9 in order to adjust the optical system 3. At this time, the camera system control unit 25 selects the method of driving the respective driving units 9 according to the ambient sound level.

For example, in the case where a user operates the operation unit 27 to drive the driving units 9 at the time of moving image shooting, the sound processing unit 26 is first controlled to obtain the subject sound level. The subject sound used herein means an ambient sound generated around the imaging apparatus 1 and collected by the microphone 7. The sound processing unit 26 samples the levels of sound signals obtained by the microphone 7 for a predetermined period, obtains an averaged level as the subject sound level, and transmits the subject sound level to the camera system control unit 25. Note that the subject sound level may be obtained by calculating the power spectrum of the subject sound, or may be indirectly obtained from the gain of a gain adjusting unit, described later, of the sound processing unit.

The camera system control unit 25 then compares the subject sound level obtained in step S103 with the driving sound level of the driving units being operated, and determines whether the driving sound of the driving units has a large influence on the subject sound (step S105). Note that the driving sound level of the driving units is recorded in advance in, for example, a Flash ROM inside the camera system control unit 25. For example, the driving sound level of each driving unit associated with each lens mounted shown in FIG. 4 may be recorded in the Flash ROM. Alternatively, information similar to that shown in FIG. 4 may be obtained from the mounted lenses through communication. Further alternatively, a driving sound may be obtained by operating the driving units 9 of the mounted lenses prior to recording a sound, and then the driving sound may be recorded in the Flash ROM. The lenses are operated at the time of being mounted, for example. However, the lenses may be operated at any time. The influence of the driving sound may be determined based on whether the subject sound level is higher or lower than a predetermined threshold, without using the driving sound level of the driving units being operated. As described above, the determination is performed by the camera system control unit 25.

Figure 4:
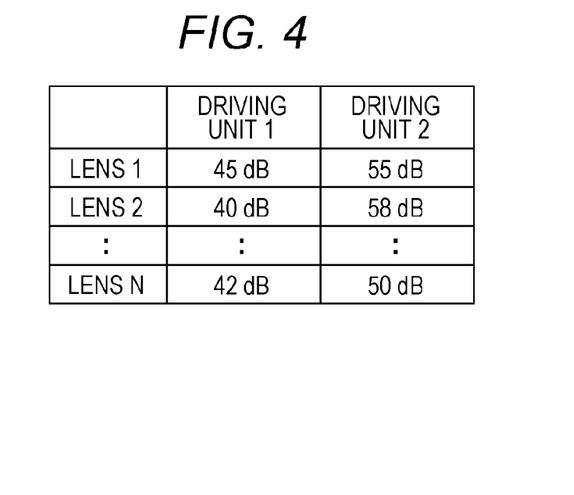
FIG. 4 is a table showing information related to a driving sound of a driving unit in a lens unit.

Note that in FIG. 4, the driving unit 1 and the driving unit 2 correspond to the focus lens driving unit 9a and the diaphragm driving unit 9c, respectively, among the driving units 9.

Figure 5A:
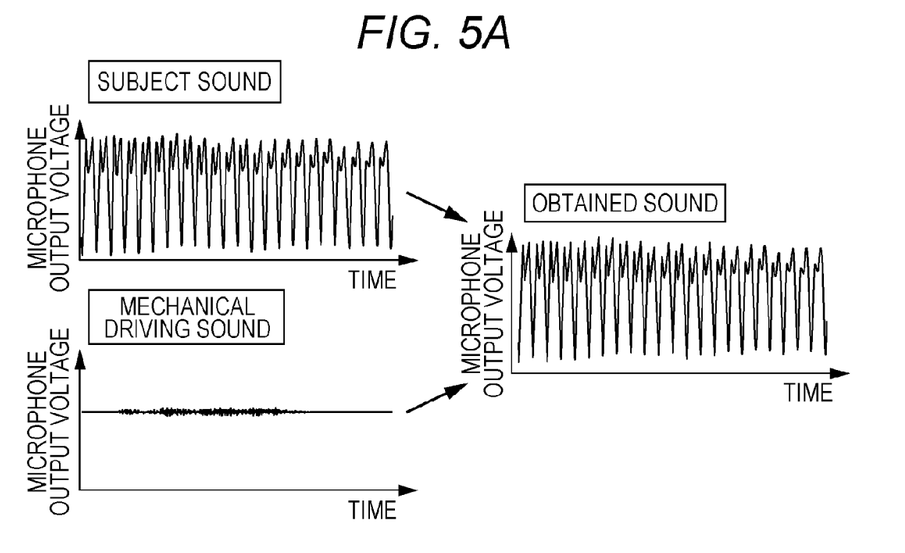
FIGS. 5A and 5B are graphs showing an influence of a driving sound on a subject sound.
Figure 5B:
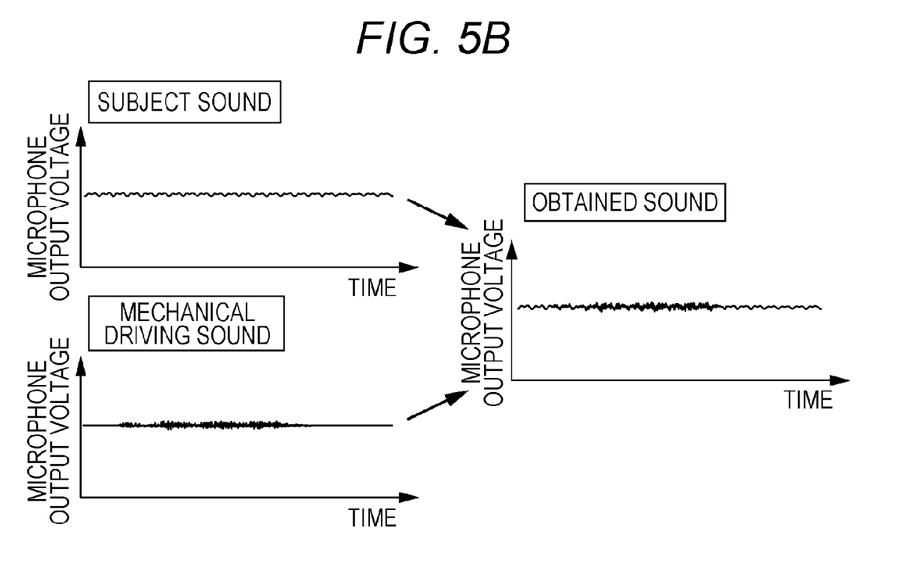

The comparison of sound levels in step S105 will now be described with reference to FIGS. 5A and 5B. The horizontal axis of each graph in FIGS. 5A and 5B represents time, and the vertical axis thereof represents an output voltage sound level (sound level) of the microphone 7. The graphs in FIG. 5A schematically show sound signals obtained when the subject sound level (the ambient sound around the imaging apparatus) is high. The graphs in FIG. 5B schematically show sound signals obtained when the subject sound level (the ambient sound around the imaging apparatus) is low. Note that FIGS. 5A and 5B are graphs for describing an influence of the mechanical driving sound that depends on the subject sound level. Therefore, the graphs show signals before passing through the gain adjusting unit of the sound processing unit 26 described later.

In FIG. 5A, the subject sound is large, making the influence of the mechanical driving sound relatively small. The influence of the mechanical driving sound on the obtained sound signals is thus limited. In FIG. 5B, on the other hand, the subject sound is small, making the mechanical driving sound dominant and non-negligible. In the case where the subject sound is small as just described, the influence of the driving sound generated by the optical system driving unit 9, even when driven silently, may be non-negligible.

A relative comparison between the subject sound and the mechanical driving sound may determine whether the mechanical driving sound has an influence on the sound signals obtained as described in FIGS. 5A and 5B. For example, the comparison in step S105 is performed as follows. That is, in the case where the subject sound is larger than the mechanical driving sound by more than 20 dB, it is determined that the influence of the mechanical driving sound on the subject sound is small. In the case where the subject sound is larger than the mechanical driving sound only by 20 dB or less, on the other hand, it is determined that the influence of the mechanical driving sound on the subject sound is large. 20 dB mentioned here is just an example, and it is desirable that a threshold be appropriately determined by, for example, sensory evaluation.

When it is determined in step S105 that the influence on the subject sound is small, the process of the camera system control unit 25 proceeds to step S107. In step S107, the camera system control unit 25 instructs the lens system control unit 28 to operate the driving units 9 as silently as possible (sometimes referred to as "silent driving" hereinafter). More specifically, the lens system control unit 28 drives the driving units 9 at a low speed, thereby suppressing the level of noise generated by the driving units 9 being driven. The process then proceeds to step S109, where the camera system control unit 25 controls the sound processing unit 26 to execute filter processing on the sound signals obtained by the microphone 7. The filter processing will be described later. In the filter processing, for example, frequency components abundantly contained in the driving sound are reduced. The filter processing is executed by, for example, a high-pass filter or a band-pass filter.

When it is determined in step S105 that the influence on the subject sound is large, on the other hand, the process of the camera system control unit 25 proceeds to step S111. In step S111, the camera system control unit 25 instructs the lens system control unit 28 to drive the driving units 9 such that a sound-generating period would be as shorter as possible than a predetermined period (sometimes referred to as "short-time driving" hereinafter). More specifically, the lens system control unit 28 drives the driving units 9 at a high speed, thereby making the period, during which the driving sound (or noise) is generated, shorter than the predetermined period. The process then proceeds to step S113, where the camera system control unit 25 controls the sound processing unit 26 to execute prediction processing on the sound signals obtained by the microphone 7. The prediction processing will be described later. An example of executing the prediction processing is described in the present embodiment. Alternatively, however, processing of muting sound signals obtained in a noise period, or processing of replacing the sound signals with predetermined signals (e.g., low-frequency sound signals called "white noise) may also be executed.

As described above, in the present embodiment, the sound-generating period is shorter than a predetermined period in the short-time driving. The noise-generating period is preferably shorter than the period of silent driving (or normal driving) in S107.

Figure 6:
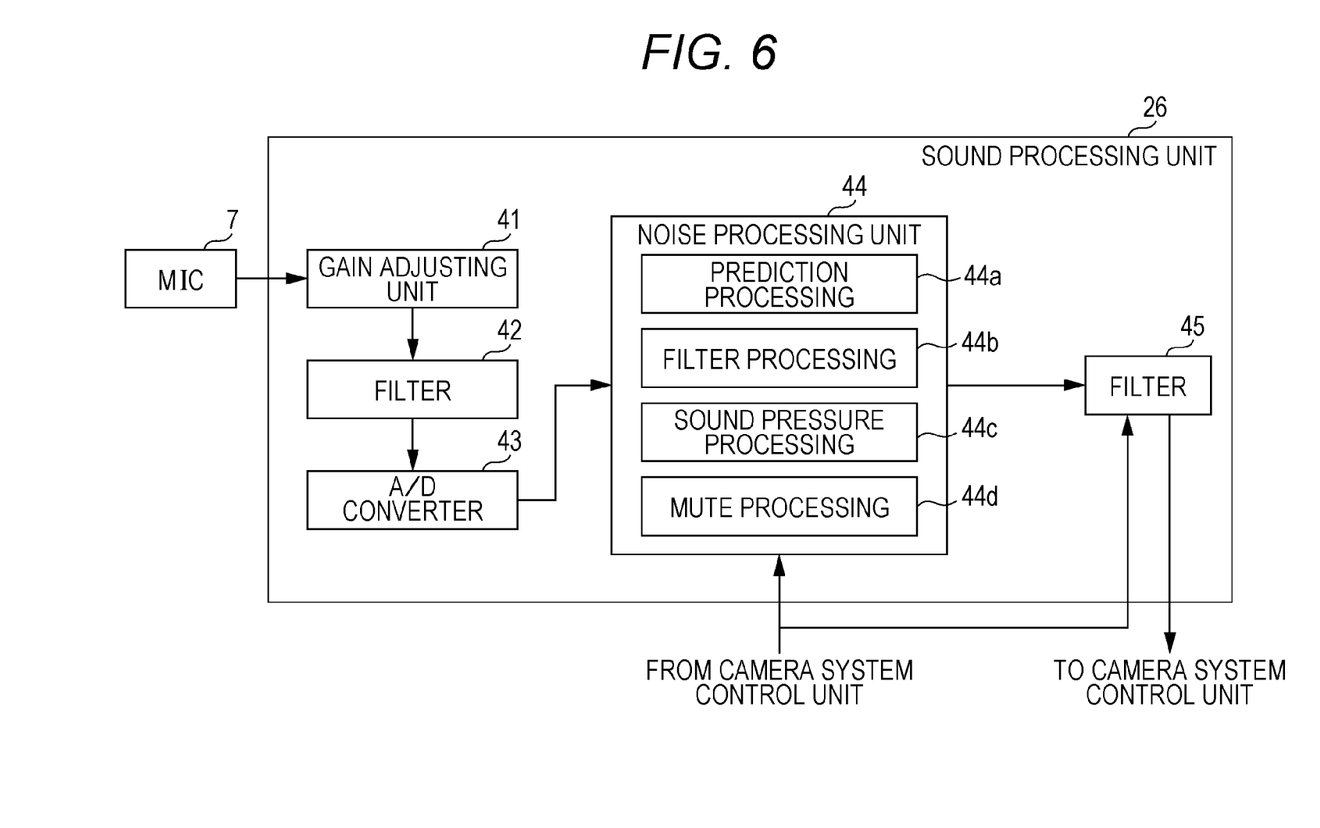
FIG. 6 is a diagram illustrating internal blocks of a sound processing unit.

Next, the sound processing unit 26 will be described with reference to FIG. 6. The sound processing unit 26 in FIG. 6 includes a gain adjusting unit 41, a filter 42, an A/D converter 43, a noise processing unit 44, and a filter 45.

Signals obtained by the microphone 7 are supplied to the gain adjusting unit 41. The gain adjusting unit 41 adjusts the signal level of the microphone 7 so as to make full use of a dynamic range of the A/D converter 43. That is, the gain adjusting unit 41 increases the gain to amplify the signals when the signal level of the microphone 7 is low, and decreases the gain to prevent saturation when the signal level of the microphone 7 is high. The filter 42 is constituted by, for example, a low-pass filter having an appropriate cut-off frequency, in consideration of a sampling frequency of the A/D converter 43. The filter 42 may also include a notch filter in addition to the low-pass filter just described, in the case where the microphone is in the vicinity of an element that emits a signal having a specific frequency. The A/D converter 43 digitally converts the signals that have been processed by the gain adjusting unit 41 and the filter 42.

The noise processing unit 44 can execute a plurality of types of noise processing. In the example of FIG. 6, any of prediction processing 44a, filter processing 44b, sound pressure processing 44c, and mute processing 44d can be executed. The noise processing unit 44 executes the noise processing selected by the camera system control unit 25. The plurality of types of noise processing can be executed selectively or in combination under the control of the camera system control unit 25.

The filter 45 executes appropriate filter processing, as necessary, after the noise processing. The filter processing by the filter 45 may not be executed, if not necessary.

Next, the presence/absence of the mechanical driving sound, and the operation of the sound processing unit 26 described above will be described in detail.

When there is no mechanical driving sound, none of the driving units is being operated. In this case, therefore, the camera system control unit 25 controls the noise processing unit 44 not to execute any noise processing. The filter 45 is not operated, either. At this time, the signals themselves converted by the A/D converter 43 are transmitted to the camera system control unit 25 as sound signals for recording.

An example will be described next where the mechanical driving sound is present but does not have a large influence on the subject sound. As described above with reference to FIG. 3, in the case where the mechanical driving sound does not have a large influence on the subject sound, the camera system control unit 25 controls the lens system control unit 28 to drive the driving units 9 silently.

The signals obtained in this case are those shown in the graphs of FIG. 5A, for example. In this case, the influence of the mechanical driving sound on the subject sound is small. To further reduce the influence of the mechanical driving sound, noise may be reduced through filter processing, for example. In this case, the camera system control unit 25 controls the noise processing unit 44 to execute the filter processing.

FIGS. 7A to 7D are graphs showing changes in signals caused by the filter processing.

The horizontal axis of each graph in FIGS. 7A to 7D represents time, and the vertical axis thereof represents the output voltage of the microphone 7.

Figure 7A:
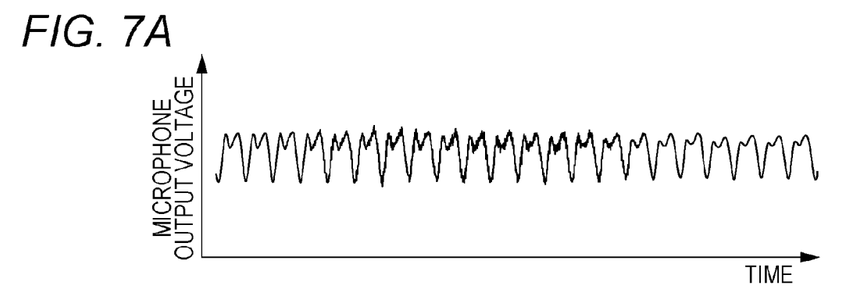
FIGS. 7A to 7D are graphs for describing filter processing for sound signals.
Figure 7B:
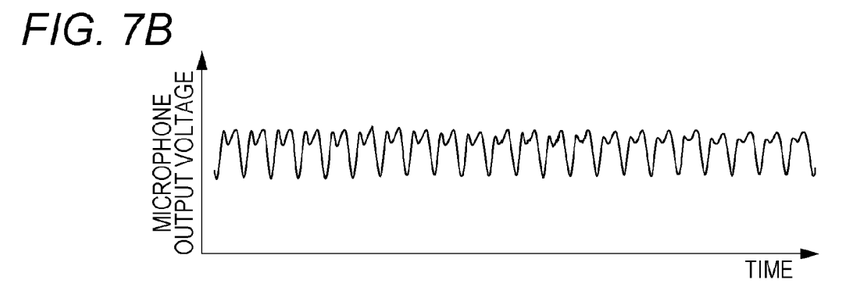

The graph in FIG. 7A shows sound signals obtained with the subject sound and the mechanical driving sound overlapped, in the case where the subject sound is large. The graph in FIG. 7B shows sound signals obtained by processing the sound signals shown in FIG. 7A with a low-pass filter. The graph in FIG. 7C, on the other hand, shows sound signals obtained with the subject sound and the mechanical driving sound overlapped, in the case where the subject sound is small. The graph in FIG. 7D shows sound signals obtained by processing the sound signals shown in FIG. 7C with a low-pass filter.

Figure 7C:
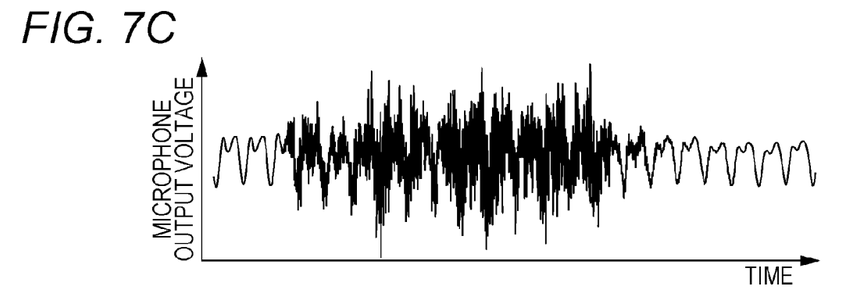
Figure 7D:
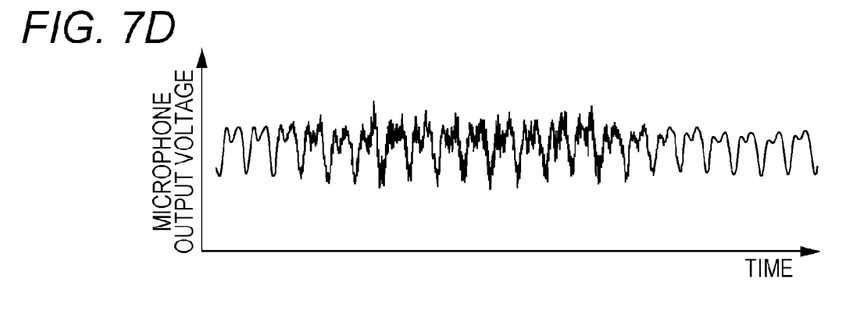

The signals shown in FIG. 7C have an amplitude similar to that of the signals shown in FIG. 7A, although the subject sound in the example of FIG. 7C is smaller. This is because the gain is increased in the example of FIG. 7C such that the subject sound would reach an appropriate level. The level of the mechanical driving sound, on the other hand, is shown with a large difference between FIGS. 7A and 7C, but actually the sounds of the same level arrive. To visually recognize the effects of the filter processing with ease, the graphs in FIGS. 7A to 7D show signals that have been processed by the gain adjusting unit 41 described above.

The influence of the mechanical driving sound has sufficiently been reduced in the signals shown in FIG. 7B obtained by processing the signals shown in FIG. 7A with a low-pass filter. As a result, a high-quality subject sound is obtained in the signals shown in FIG. 7B. On the other hand, components of the mechanical driving sound still remain in a large amount in the signals shown in FIG. 7D obtained by processing the signals shown in FIG. 7C with a low-pass filter. Furthermore, even with a plurality of low-pass filters applied, it is difficult to obtain a high-quality subject sound because the mechanical driving sound also contains signals having the same bandwidth as the subject sound.

As described with reference to FIGS. 7A to 7D, when the subject sound is large, a high-quality subject sound can be obtained by operating the driving units 9 to reduce the mechanical driving sound and executing appropriate filter processing. When the subject sound is small, on the other hand, a high-quality subject sound may not be obtained with the above method.

An example will be described next where the mechanical driving sound is present and has a large influence on the subject sound. As described with reference to FIG. 2, in the case where the mechanical driving sound has a large influence on the subject sound, the camera system control unit 25 instructs the lens system control unit 28 to drive the driving units 9 for a short time. Examples of signals obtained in this case are shown in FIGS. 8A to 8D.

Figure 8A:
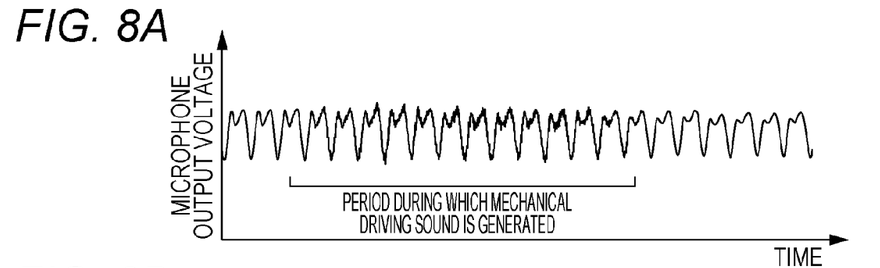
FIGS. 8A to 8D are graphs showing an influence exerted by short-time driving of the driving unit.
Figure 8B:
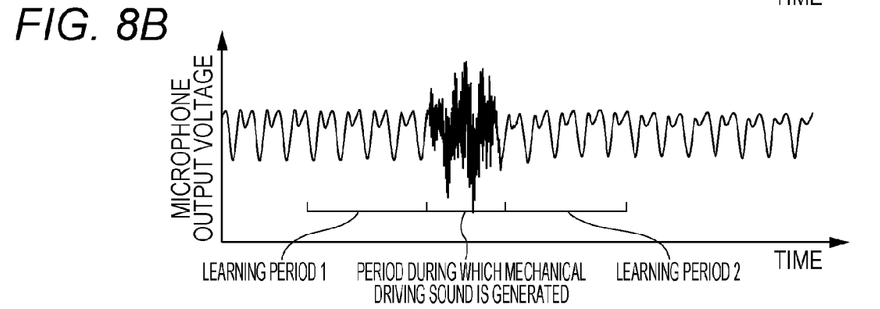
Figure 8C:
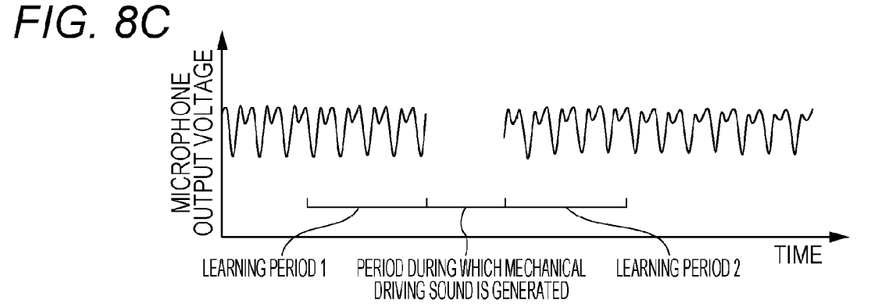
Figure 8D:
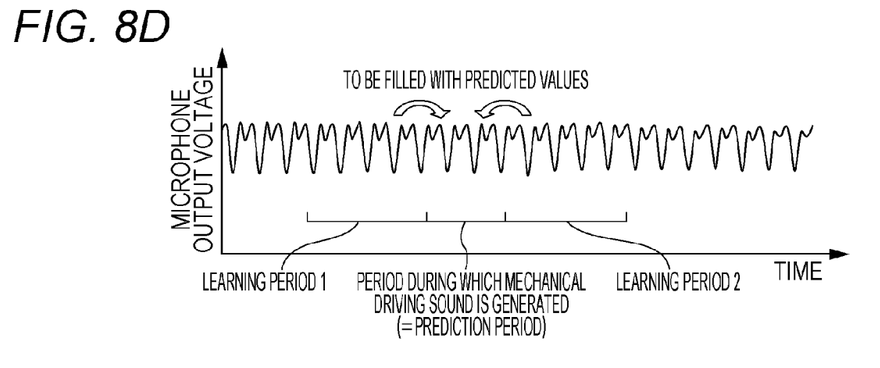

The graph in FIG. 8A shows sound signals obtained in the case where the mechanical driving sound described above is present but does not have a large influence on the subject sound. The graph in FIG. 8B shows sound signals obtained in the case where the mechanical driving sound described above is present and has a large influence on the subject sound. The graph in FIG. 8C shows sound signals obtained by partially processing the signals shown in FIG. 8B by the prediction processing. The graph in FIG. 8D shows sound signals obtained by processing the signals shown in FIG. 8B by the prediction processing.

The comparison between FIGS. 8A and 8B makes it clear that, in the case where the mechanical driving sound is present and has a large influence on the subject sound, the driving units 9 are driven for a short time, and thus the period during which the mechanical driving sound is generated is short. Although the period during which the mechanical driving sound is generated is short, the level of the mechanical driving sound is not necessarily low. For easy understanding, an example is shown in FIG. 8B where the level of the mechanical driving sound becomes significantly high upon short-time driving.

In the present embodiment, the camera system control unit 25 controls the noise processing unit 44 to execute noise processing, by means of the prediction processing, in the period during which the mechanical driving sound is generated upon short-time driving.

The prediction processing by the noise processing unit 44 will be described.

In the prediction processing, sound signals in the period during which noise is generated are interpolated with signals generated based on sound signals in the previous period and/or the following period. More specifically, in the prediction processing, the sound signals in the period during which noise is generated are not used but replaced with signals generated based on sound signals in a period other than the period during which noise is generated.

In the prediction processing, first, signals in the period during which the mechanical driving sound is generated are discarded as shown in FIG. 8C. Next, as described below, a learning operation and a prediction operation are performed, and signals obtained by the prediction operation are used to interpolate the signals in the period during which the mechanical driving sound is generated (prediction period).

That is, the noise processing unit 44 executes processing of interpolating the sound signals in the noise generation period using signals generated based on sound signals in the previous period and/or the following period. Note that, since the camera system control unit 25 transmits lens operation signals to the lens system control unit 28, the camera system control unit 25 can determine the noise generation period. The noise processing unit 44 executes the above processing by receiving, from the camera system control unit 25, information on the noise generation period.

Here, derivation of a linear prediction coefficient (learning operation) and prediction of signals using the linear prediction coefficient (prediction operation), which are used in the prediction processing of the present embodiment, will be described.

To use linear prediction, the current signals and a finite number of (p in this case) adjacent sample values are assumed to have the following relationship of linear first-order combination.

$$x_t + \alpha_1 x_{t-1} + \ldots + \alpha_p x_{t-p} = \epsilon_t \quad \text{[Expression 1]}$$

where $\epsilon_t$ are mutually non-correlated random variables of an average value=0 and variance=$\sigma^2$. This expression is modified as follows, so as to predict $\chi_t$ from previous values $$x_t = \quad \text{[Expression 2]}$$
$$\hat{x}_t + \varepsilon_t = -\alpha_1 x_{t-1} - \ldots - \alpha_p x_{t-p} + \varepsilon_t = -\sum_{i=1}^{p} \alpha_i x_{t-i} + \varepsilon_t$$

According to Expression 2, if $\epsilon_t$ is sufficiently small, the current value is expressed by a linear sum of p neighboring values. After $\chi_t$ is calculated by the above prediction, if its approximation is sufficiently good, $\chi_{t+1}$ can be also calculated by a linear sum of p neighboring values. If $\epsilon_t$ can be made sufficiently small in this manner, signals can be obtained by sequentially predicting values. Therefore, a method of calculating $\alpha_i$, which minimizes $\epsilon_t$, will be examined. In the present invention, the operation of calculating $\alpha_i$, which minimizes $\epsilon_t$, is called a learning operation.

In the learning periods described above, a square sum of $\epsilon_t$ is minimized. Assuming that the start time of learning is $t_0$, and the end time thereof is $t_1$, the following expression is obtained.

$$\sum_{t=t_0}^{t_1} \varepsilon_t^2 = \sum_{t=t_0}^{t_1} \left( \sum_{i=0}^{p} \alpha_i x_{t-i} \right)^2 = \sum_{t=t_0}^{t_1} \sum_{i=0}^{p} \sum_{j=0}^{p} a_i a_j x_{t-i} x_{t-j} \quad \text{[Expression 3]}$$

where $\alpha_0 = 1$. To simplify the expression, it is modified as follows.

$$c_{ij} = \sum_{t=t_0}^{t_1} x_{t-i} x_{t-j} \quad \text{[Expression 4]}$$

To determine $\alpha_i$ so as to minimize Expression 3, Expression 3 is solved while setting a partial differential associated with $\alpha_j$ (j=1, 2, ..., p) to 0.

$$\frac{\partial}{\partial \alpha_i} \sum_{t=t_0}^{t_1} \varepsilon_t^2 = \frac{\partial}{\partial \alpha_i} \left( \sum_{i=0}^{p} \sum_{j=0}^{p} a_i c_{ij} a_j \right) = 2 \sum_{i=0}^{p} a_i c_{ij} = 0 \quad \text{[Expression 5]}$$

Expression 5 indicates that $\alpha_i$ can be determined by solving p simultaneous linear equations. In Expression 5, $c_{ij}$ can be calculated from $\chi_{t-i}$ (i=1, 2, ..., p). That is, $\alpha_i$ can be calculated from Expression 5.

When $\alpha_i$ is determined according to Expression 5, a square sum of $\epsilon_t$ has been minimized. At this time, from Expression 2, a good approximation of a value of $\chi_t$ can be obtained by:

$$\hat{x}_t \quad \text{[Expression 6]}$$

If this approximation is sufficiently good, $$\hat{x}_t \quad \text{[Expression 7]}$$

can be used as a prediction signal instead of $\chi_t$. Furthermore, as for $\chi_{t+i}$, an approximate value can be similarly calculated from signals obtained using p−1 neighboring values and prediction. By sequentially repeating this process, signals of the prediction period can be generated. In the present invention, the operation of calculating an approximation of the prediction period from the calculated $\alpha_i$ is called a prediction operation.

Next, a preferred learning operation and prediction operation will be described. As shown in FIGS. 8A to 8D, to perform the learning operation, neighboring signals before and after the prediction period are used. In this case, a nature of a sound signal, i.e., a relatively high repeatability in a very short time domain, is used.

As shown in FIGS. 8A to 8D, a learning period 1 is set before the period including the mechanical driving sound, and a learning period 2 is set after the period including the mechanical driving sound. In the learning operation and the prediction operation, calculations are performed independently for the signals in the learning period 1 and the learning period 2. Generation of signals in the prediction period after the learning operation in the learning period 1 is referred to as forward prediction. Generation of signals in the prediction period after the learning operation in the learning period 2 is referred to as backward prediction.

The signals in the prediction period are preferably obtained by appropriate calculations, where larger weights are given to values obtained by the forward prediction when the signals are closer to the learning period 1, and larger weights are given to values obtained by the backward prediction when the signals are closer to the learning period 2.

As described above, the imaging apparatus of the present embodiment switches the method of driving the driving units and the noise processing method according to the level of ambient sound signals. That is, when the level of ambient sound signals is high and the influence of the driving sound of the driving units on the subject sound is small, the driving units are driven silently, and noise reduction of reducing sound signals having a predetermined frequency through filter processing is performed. When the level of ambient sound signals is low and the influence of the driving sound of the driving units on the subject sound is large, the driving units are driven for a short time, and noise reduction is performed through prediction processing. In the prediction processing, noise reduction processing is executed in such a manner that sound signals in the noise generation period, during which the driving units are driven, are interpolated with signals generated based on ambient sound signals of the aforementioned sound signals.

Through such processing, the imaging apparatus of the present embodiment can further reduce the influence of the driving sound on a sound to be recorded, even under a quiet environment.

In the present embodiment, noise reduction is performed through the prediction processing when the level of ambient sound signals is low and the influence of the driving sound of the driving units on the subject sound is large. Alternatively, however, processing of muting a sound in a period, during which sound signals are interpolated through the prediction processing, may be executed.

In the present embodiment, the driving units are driven silently when the level of ambient sound signals is high and the influence of the driving sound of the driving units on the subject sound is small. Alternatively, however, the driving units may be driven normally, not silently.

In the present embodiment, the noise processing unit 44 is controlled to execute the filter processing when the level of ambient sound signals is high and the influence of the driving sound of the driving units on the subject sound is small. However, the filter processing may not be executed.

In the present embodiment, the camera system control unit 25 switches the method of driving the driving units 9 between the short-time driving and the silent driving (or normal driving). Alternatively, for example, a focus adjusting method may be switched between focus adjustment using a contrast change (contrast AF) and focus adjustment based on a phase difference (phase difference AF). Generally, the contrast AF takes longer for focus adjustment than the phase difference AF. By taking advantage of this nature, the contrast AF (TV AF) is adopted when the level of ambient sound signals is high and the influence of the driving sound of the driving units on the subject sound is small, because the driving units do not have to be driven for a short time. When the level of ambient sound signals is low and the influence of the driving sound of the driving units on the subject sound is large, on the other hand, the phase difference AF is adopted because the driving units are driven for a short time. Also in this manner, the driving speed and the driving time of the driving units can be adjusted.

The preferred embodiment of the present invention has been described above. However, the present invention is not limited to this embodiment, and can be modified and altered in various ways without departing from the spirit of the invention.

In the present embodiment, the imaging apparatus has been described as an example. However, any apparatus capable of processing sound signals can be used. For example, any apparatus capable of processing a sound, such as a computer, a mobile phone, and a game console, can be used. A program for causing a computer to execute the processing described above is also included in the scope of the present invention.

(Second Embodiment)

A second embodiment will be described below.

The imaging apparatus, the electrical configuration, and the sound processing unit of the second embodiment are the same as those of the first embodiment, and thus are not described here.

Figure 9:
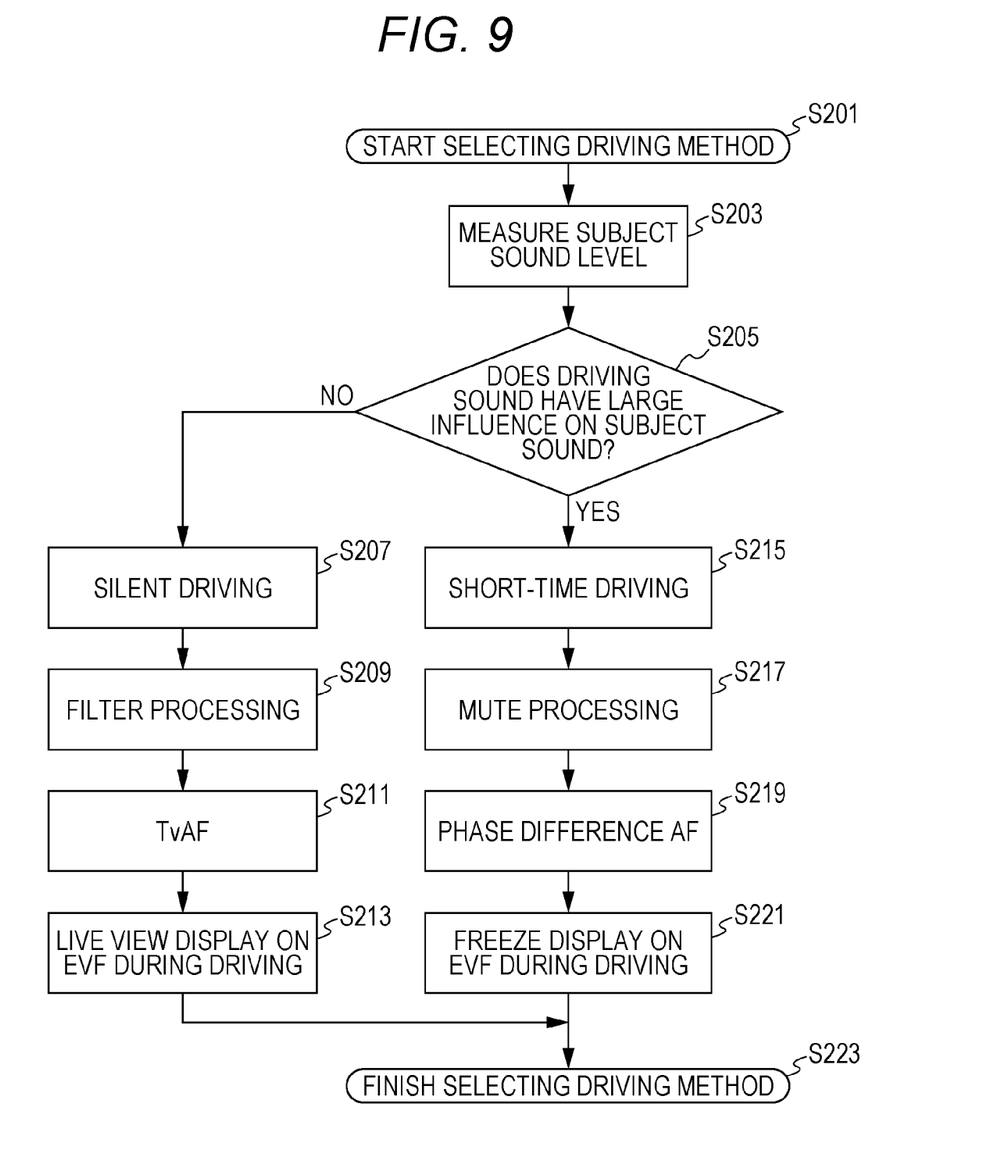
FIG. 9 is a flowchart of a second embodiment.

FIG. 9 is a flowchart for describing a method of driving the driving units 9, noise processing by a noise processing unit 44, a focus detecting unit, and selection of a display method for a display unit 22 (electronic viewfinder (EVF)) in the present embodiment.

An example will be described where a focus adjustment operation is performed during moving image shooting. At this time, a camera system control unit 25 determines, for example, the method of driving the driving units 9 according to a subject sound.

The camera system control unit 25 starts selection of the driving method and the like in step S201. In step S203, the camera system control unit 25 first controls a sound processing unit 26 to obtain a subject sound level. The subject sound used herein means an ambient sound generated around an imaging apparatus 1 and collected by a microphone 7. The sound processing unit 26 samples the levels of sound signals obtained by the microphone 7 for a predetermined period, obtains an averaged level as the subject sound level, and transmits the subject sound level to the camera system control unit 25. Note that the subject sound level may be obtained by calculating the power spectrum of the last subject sound, or may be indirectly obtained from the gain of the gain adjusting unit, described above, of the sound processing unit.

The camera system control unit 25 then determines the subject sound level obtained in step S203 (step S205). That is, as in the first embodiment, the camera system control unit 25 compares the subject sound level obtained in step S203 with the driving sound level of the driving units being operated, and determines whether the driving sound of the driving units has a large influence on the subject sound. The influence of the driving sound may be determined based on whether the subject sound level is higher or lower than a predetermined threshold, without using the driving sound level of the driving units being operated.

When it is determined in step S205 that the influence on the subject sound is small, the process of the camera system control unit 25 proceeds to step S207. In step S207, the camera system control unit 25 instructs the lens system control unit 28 to operate the driving units 9 as silently as possible (sometimes referred to as "silent driving" hereinafter). More specifically, the lens system control unit 28 drives the driving units 9 at a low speed, thereby suppressing the level of noise generated by the driving units 9 being driven. The process then proceeds to step S209, where the camera system control unit 25 controls the sound processing unit 26 to execute filter processing on the sound signals obtained by the microphone 7.

The process then proceeds to step S211, where the camera system control unit 25 controls the focus detecting unit 12 to perform focus detection based on a contrast change. The process then proceeds to step S213, where the camera system control unit 25 controls the display unit 22 to display a live view of the image obtained by the image pickup device 6 while the mechanical driving sound is generated.

When it is determined in step S205 that the influence on the subject sound is large, on the other hand, the process of the camera system control unit 25 proceeds to step S215. In step S215, the camera system control unit 25 instructs the lens system control unit 28 to drive the driving units 9 such that the sound-generating period would be as short as possible. More specifically, the lens system control unit 28 drives the driving units 9 at a high speed, thereby shortening the period during which the driving sound is generated. The process then proceeds to step S217, where the camera system control unit 25 controls the sound processing unit 26 to execute mute processing on the sound signals obtained by the microphone 7.

The process of the camera system control unit 25 then proceeds to step S219, where the camera system control unit 25 controls the focus detecting unit 12 to perform focus detection based on a phase difference (referred to as "phase difference AF" hereinafter).

The process of the camera system control unit 25 then proceeds to step S221. In step S221, the camera system control unit 25 controls the display unit 22 to fix an image to be displayed (so-called "freeze display") while the mechanical driving sound is generated.

The operation in the case where the influence on the subject sound is small will be described here.

The filter processing and prediction processing for a sound have been described in the first embodiment. Other types of processing will be described in this embodiment. The silent driving is performed when the subject sound is large. Under the silent driving, the driving speed of the driving units 9 is generally decreased. Meanwhile, in the focus detection based on a contrast change, a contrast change is observed to search for a portion with the highest contrast. It is thus desirable to operate the driving unit 9 for focus adjustment at a relatively low speed. Therefore, the focus adjustment based on a contrast change is preferable in the focus detecting operation during the silent driving. Furthermore, under the silent driving, the period during which the mechanical driving sound is generated is predicted to be long. Therefore, a screen being used for imaging is displayed as it is on the display unit 22 (i.e., live view display). In this case, the driving unit 9 for focus adjustment is operated at a relatively low speed. Therefore, the focus adjustment is gradually achieved even for a live view, thereby eliminating a possible strange or uncomfortable feeling.

The operation in the case where the influence on the subject sound is large will be described next. In the present embodiment, the camera system control unit 25 controls the noise processing unit 44 to execute mute processing.

Figure 10A:
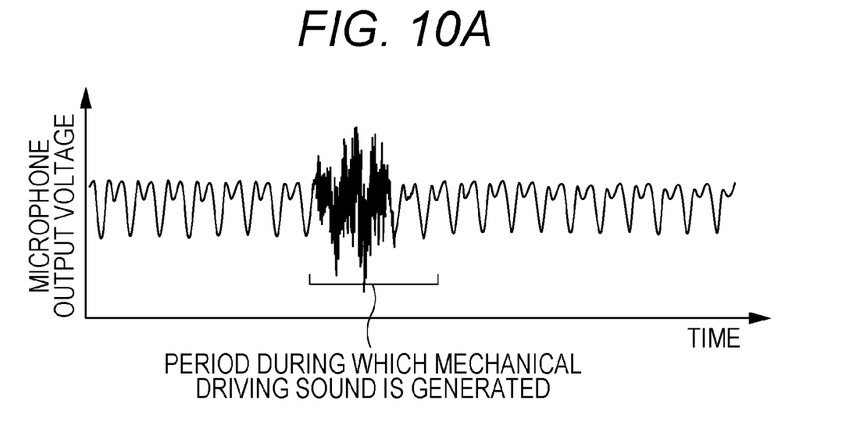
FIGS. 10A and 10B are graphs for describing mute processing for sound signals.
Figure 10B:
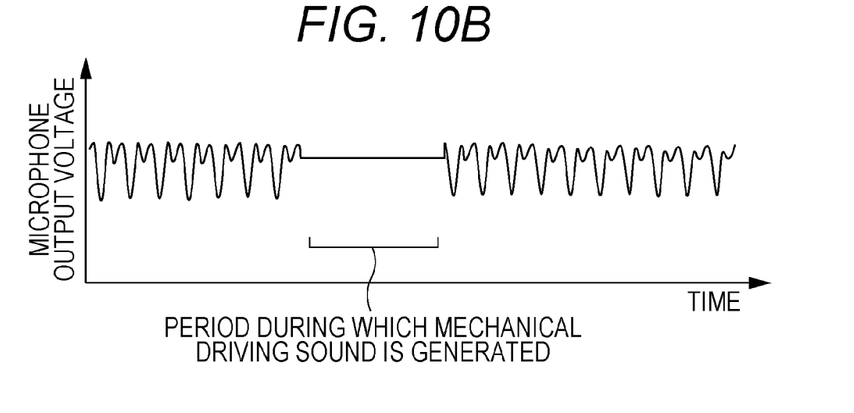

FIGS. 10A and 10B are graphs schematically illustrating signals subjected to the mute processing in the case where the influence on the subject sound is small. The horizontal axis of each graph in FIGS. 10A and 10B represents time, and the vertical axis thereof represents a microphone output voltage.

The graph in FIG. 10A shows obtained sound signals, while the graph in FIG. 10B shows sound signals obtained by subjecting the sound signals of FIG. 10A to the mute processing. As shown in FIGS. 10A and 10B, in the case where the mute processing is executed when the subject sound is somewhat large, the signals subjected to the mute processing are omitted, making a sound to be reproduced strange.

Figure 11A:
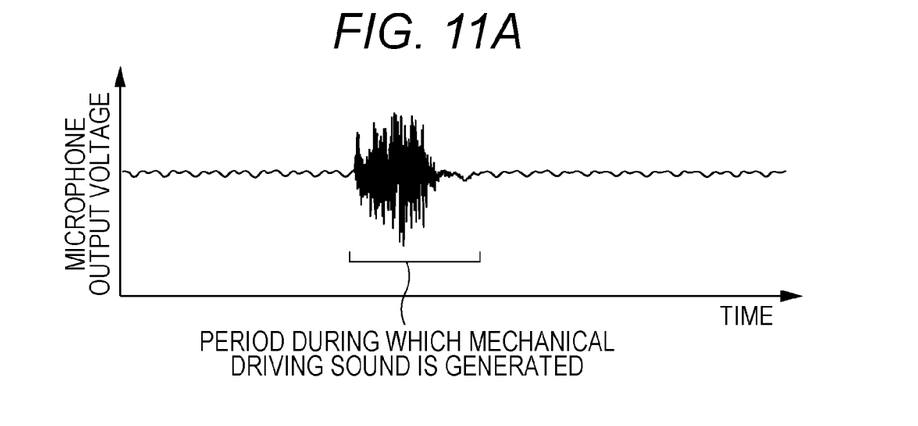
FIGS. 11A to 11C are graphs for describing the operation of prediction processing of the second embodiment.
Figure 11B:
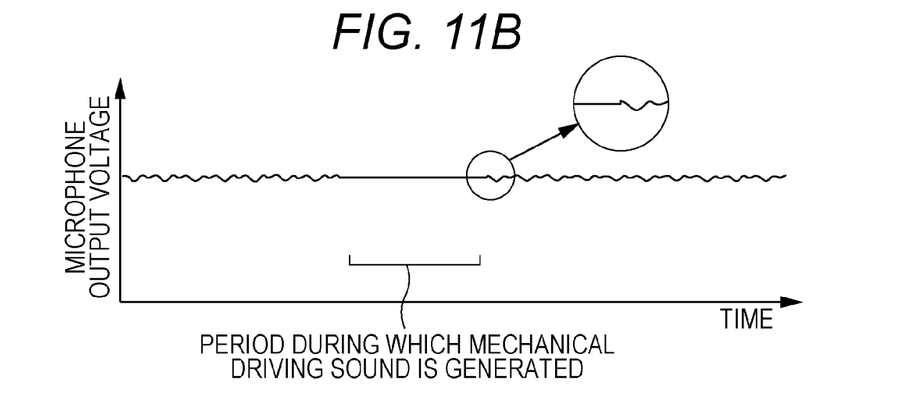
Figure 11C:
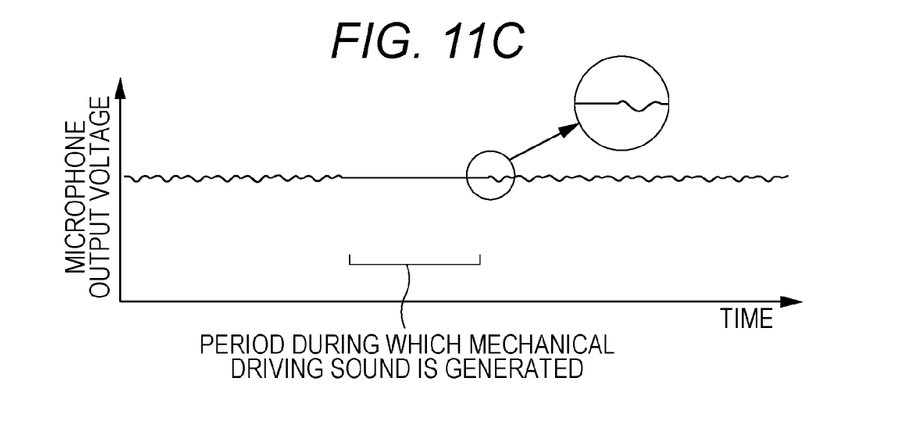

FIGS. 11A to 11C are graphs schematically illustrating signals subjected to the mute processing in the case where the influence on the subject sound is large. The horizontal axis of each graph in FIGS. 11A and 11B represents time, while the vertical axis thereof represents a microphone output voltage.

The graph in FIG. 11A shows obtained sound signals, the graph in FIG. 11B shows sound signals obtained by subjecting the sound signals of FIG. 11A to the mute processing, and the graph in FIG. 11C shows sound signals obtained by processing the sound signals of FIG. 11B with a low-pass filter.

As shown in FIGS. 11A to 11C, a difference between the signals subjected to the mute processing and the signals before and after the mute processing is small as compared to the case of FIGS. 10A and 10B. Therefore, a sound to be reproduced sounds less strange. It is obvious that a duration of the mute processing is short and, therefore, the smaller the subject sound, the less strange the sound to be reproduced. Furthermore, although the mute processing generates a discontinuity in the signals, the strangeness of a sound caused by the discontinuity can be reduced through the processing by a low-pass filter. For example, the filter 45 illustrated in FIG. 6 is appropriately set to achieve the processing by the low-pass filter.

As described above, the short-time driving is performed when the influence on the subject sound is large. Under the short-time driving, the driving speed of the driving units 9 increases. Meanwhile, it is not necessary to conduct a search in the phase difference AF, and a quick shift to a focus position is desirable. It is therefore desirable to operate the focus adjusting unit at a high speed. As the method of performing phase difference AF during moving image shooting, Japanese Patent Application Laid-Open No. 2000-156823 discloses a technique for performing phase difference AF on an imaging plane, for example. Furthermore, under the short-time driving, the period during which the mechanical driving sound is generated is short. Therefore, an image displayed on an EVF is frozen. In this case, under the short-time driving, the driving for focus adjustment is predicted to be completed in several tens of milliseconds. Therefore, the number of frames to be frozen is about one or two.

As described above, it is preferable to cause the noise processing unit to execute the mute processing in the case where the influence on the subject sound is large. Furthermore, in the mute processing, it is desirable to shorten the period to be muted in order to make the sound less unnatural. Therefore, the short-time driving is very effective when performed while the subject sound is small. The operation suitable for moving image shooting can be achieved by switching the focus detecting unit and the display method for an electronic viewfinder, in addition to the short-time driving.

As described above, it is possible to further reduce the influence of the driving sound on a sound to be recorded, even under a quiet environment.

The preferred embodiment of the present invention has been described above. However, the present invention is not limited to this embodiment, and can be modified and altered in various ways without departing from the spirit of the invention.

In the present embodiment, the imaging apparatus has been described as an example. However, any apparatus capable of processing sound signals can be used. For example, any apparatus capable of processing a sound, such as a computer, a mobile phone, and a game console, can be used. A program for causing a computer to execute the processing described above is also included in the scope of the present invention.

(Other Embodiments)

The embodiments described above can also be realized by software in a computer (or a CPU, an MPU or the like) of a system or an apparatus. If the above embodiments are realized by a computer, therefore, a computer program itself installed in the computer can also realize the present invention. That is, a computer program itself for realizing the functions of the above embodiments is also a part of the present invention.

Note that the computer program for realizing the above embodiments may be in any form, as long as the program is computer-readable. For example, the program can be constituted by an object code, a program to be executed by an interpreter, or script data to be supplied to an OS, but examples of the constituents of the program are not limited to these. The computer program for realizing the above embodiments is supplied to a computer via a non-transitory storage medium or through wire/wireless communication. Examples of the non-transitory storage medium used for supplying the program include a magnetic storage medium such as a flexible disk, a hard disk, or a magnetic tape, an optical/magneto-optical storage medium such as an MO, a CD, or a DVD, and a non-volatile semiconductor memory.

The computer program is supplied through wire/wireless communication by using, for example, a server on a computer network. In this case, a data file (program file) that may constitute the computer program according to the present invention is stored in the server. The program file may be either an executable file or a source code. The program file is downloaded to a client computer that has accessed the server, whereby the program is supplied to the computer. In this case, the program file may be divided into a plurality of segment files, and the divided segment files may be distributed to and arranged in different servers. That is, a server apparatus, which provides the client computer with the program file for realizing the above embodiments, is also a part of the present invention.

Alternatively, a storage medium, which has stored therein an encrypted computer program for realizing the above embodiments, may be distributed. Key information for decrypting the program is then supplied to a user who satisfies a predetermined condition, to allow the user to install the program on his/her computer. The key information can be supplied, for example, by being downloaded from a homepage via the Internet. The computer program for realizing the above embodiments may utilize functions of an OS already running on a computer. Furthermore, the computer program for realizing the above embodiments may be partially constituted by firmware such as an expansion board to be mounted on a computer, or may be executed by a CPU included in the expansion board or the like.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-046773, filed Mar. 2, 2012 which is hereby incorporated by reference herein in its entirety.

What is claimed is:

1. An imaging apparatus, comprising:
an imaging unit;
a driving unit configured to drive an optical system for the imaging unit, the driving unit having a plurality of driving modes including a first driving mode and a second driving mode;
a sound obtaining unit configured to obtain a sound signal;
a sound processing unit configured to process the sound signal obtained by the sound obtaining unit, the sound processing unit being arranged to execute a first process for reducing noise in the sound signal obtained by the sound obtaining unit; and
a control unit configured to control the driving mode of the driving unit and the sound processing unit in accordance with a level of the sound signal obtained by the sound obtaining unit,
wherein the control unit controls the driving unit to drive the optical system in the first driving mode and controls the sound processing unit to execute the first process, in a case where the level of the sound signal obtained by the sound obtaining unit is lower than a predetermined level, and
the control unit controls the driving unit to drive the optical system in the second driving mode and controls the sound processing unit not to execute the first process, in a case where the level of the sound signal obtained by the sound obtaining unit is equal to or higher than the predetermined level.

2. The imaging apparatus according to claim 1, wherein the first process includes a process for reducing a driving sound of the optical system included in the sound signal obtained by the sound obtaining unit.

3. The imaging apparatus according to claim 1, further comprising:
a storage unit configured to store information relating to a level of a driving sound to be generated by the optical system,
wherein the control unit uses the level of the driving sound indicated by the information stored in the storage unit as the predetermined level.

4. The imaging apparatus according to claim 1, wherein the first process includes a process for replacing a sound signal in a driving period of the optical system with a signal generated based on a sound signal in a period other than the driving period of the optical system.

5. The imaging apparatus according to claim 1, wherein the control unit changes a status of a display unit which displays an image relating to an image signal obtained by the imaging unit in accordance with the level of the sound signal obtained by the sound obtaining unit.

6. The imaging apparatus according to claim 1, wherein the control unit changes a method of detecting focus of an optical image of a subject input through the optical system in accordance with the level of the sound signal obtained by the sound obtaining unit.

7. The imaging apparatus according to claim 1, wherein the driving unit moves the optical system in the first mode faster than the second mode.

8. The imaging apparatus according to claim 1, wherein the driving sound generated in the first mode is louder than the second mode.

9. The imaging apparatus according to claim 3, wherein the control unit compares the level of the sound signal obtained by the sound obtaining unit with the level of the driving sound indicated by the information stored in the storage unit.

10. A sound processing apparatus, comprising:
a sound obtaining unit configured to obtain a sound signal;
a sound processing unit configured to process the sound signal obtained by the sound obtaining unit, the sound processing unit being arranged to execute a first process for reducing noise in the sound signal obtained by the sound obtaining unit; and
a control unit configured to control a driving mode of a driving device having a plurality of driving modes including a first driving mode and a second driving mode and the sound processing unit in accordance with a level of the sound signal obtained by the sound obtaining unit,
wherein the control unit drives the driving device in the first driving mode and controls the sound processing unit to execute the first process, in a case where the level of the sound signal obtained by the sound obtaining unit is lower than a predetermined level, and
the control unit drives the driving device in the second driving mode and controls the sound processing unit not to execute the first process, in a case where the level of the sound signal obtained by the sound obtaining unit is equal to or higher than the predetermined level.

11. The sound processing apparatus according to claim 10, wherein the first process includes a process for reducing a driving sound of the driving device included in the sound signal obtained by the sound obtaining unit.

12. The sound processing apparatus according to claim 10, further Comprising:
a storage unit configured to store information relating to a level of a driving sound to be generated by the driving device,
wherein the control unit uses the level of the driving sound indicated by the information stored in the storage unit as the predetermined level.

13. The sound processing apparatus according to claim 10, wherein the first process includes a process for replacing a sound signal in a driving period of the driving device with a signal generated based on a sound signal in a period other than the driving period of the driving device.

14. The sound processing apparatus according to claim 10, wherein the driving device moves a predetermined device in the first mode faster than the second mode.

15. The sound processing apparatus according to claim 10, wherein the driving sound generated in the first mode is louder than the second mode.

16. The sound processing apparatus according to claim 12, wherein the control unit compares the level of the sound signal obtained by the sound obtaining unit with the level of the driving sound indicated by the information stored in the storage unit.

17. A sound processing apparatus, comprising:
a sound obtaining unit configured to obtain a sound signal;
a sound processing unit configured to process the sound signal obtained by the sound obtaining unit, the sound processing unit executing a noise reduction process selected from among a plurality of noise reduction processes each for reducing noise in the sound signal obtained by the sound obtaining unit; and
a control unit configured to control a driving mode of a driving device having a plurality of driving modes including a first driving mode and a second driving mode and the sound processing unit,
wherein the control unit, in accordance with a level of the sound signal obtained by the sound obtaining unit, selects the driving mode of the driving device from among the plurality of driving modes and selects the noise reduction process of the sound processing unit from among the plurality of noise reduction processes.

18. The sound processing apparatus according to claim 17, wherein the driving device moves a predetermined device in the first mode faster than the second mode, the plurality of noise reduction processes includes a first process for reducing a driving sound from the driving device included in the sound signal obtained by the sound obtaining unit by using a filter and a second process for replacing a sound signal obtained in a driving period of the driving device with a sound signal for replacing generated by using a sound signal in a period other than the driving period,
wherein the control unit selects the first driving mode and selects the second process, in a case where the level of the sound signal obtained by the sound obtaining unit is lower than a predetermined level, and
wherein the control unit selects the second driving mode and selects the first process, in a case where the level of the sound signal obtained by the sound obtaining unit is equal to or higher than the predetermined level.

* * * * *